No. 636,665. Patented Nov. 7, 1899.
S. F. HICKS.
CORN SHELLER.
(Application filed Aug. 23, 1898.)
(No Model.) 4 Sheets—Sheet 1.
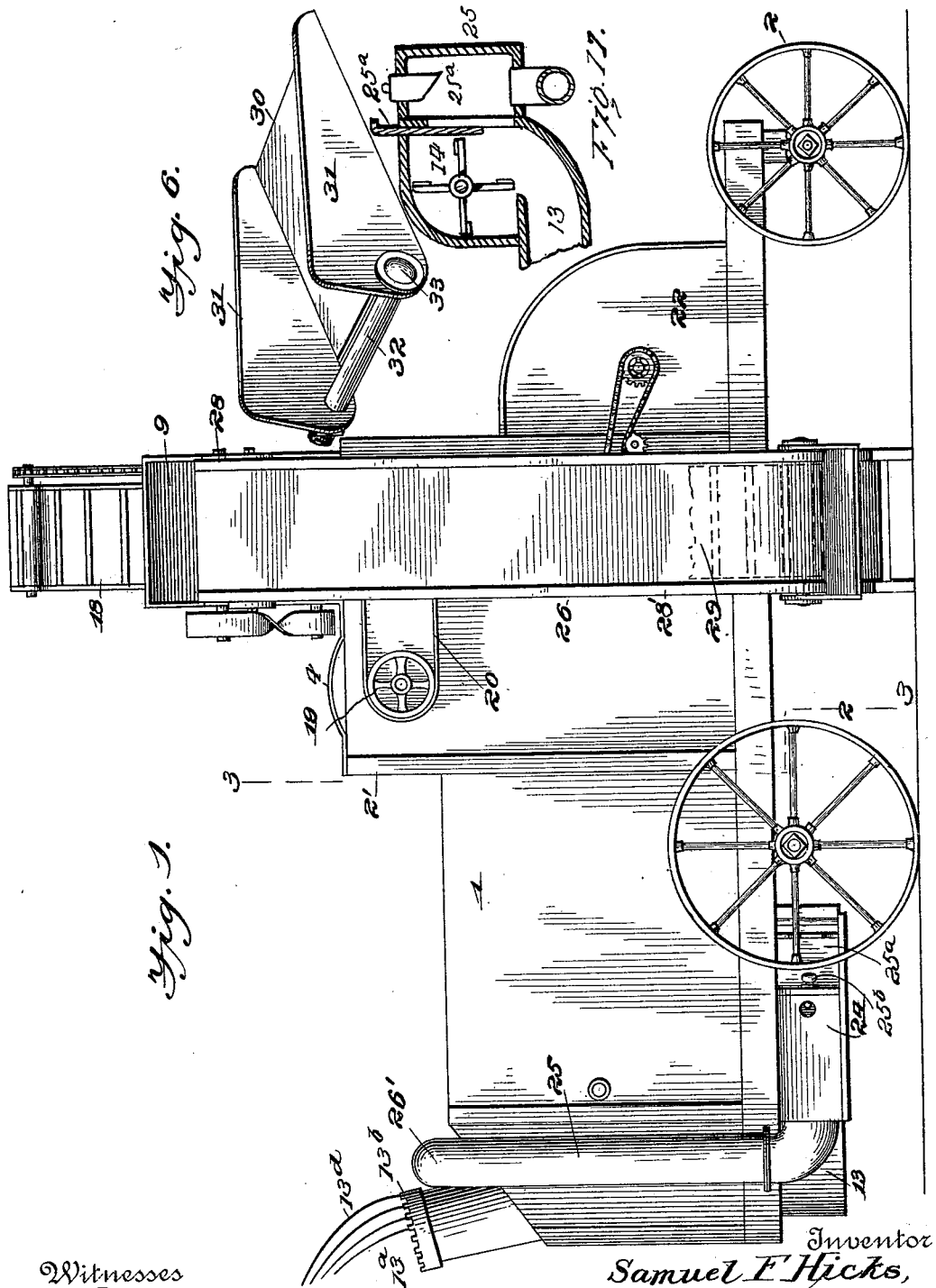
Witnesses
Inventor
Samuel F. Hicks,
By Fred G. Coldren
Attorney No. 636,665. Patented Nov. 7, 1899.
S. F. HICKS.
CORN SHELLER.
(Application filed Aug. 23, 1898.)
(No Model.) 4 Sheets—Sheet 2.
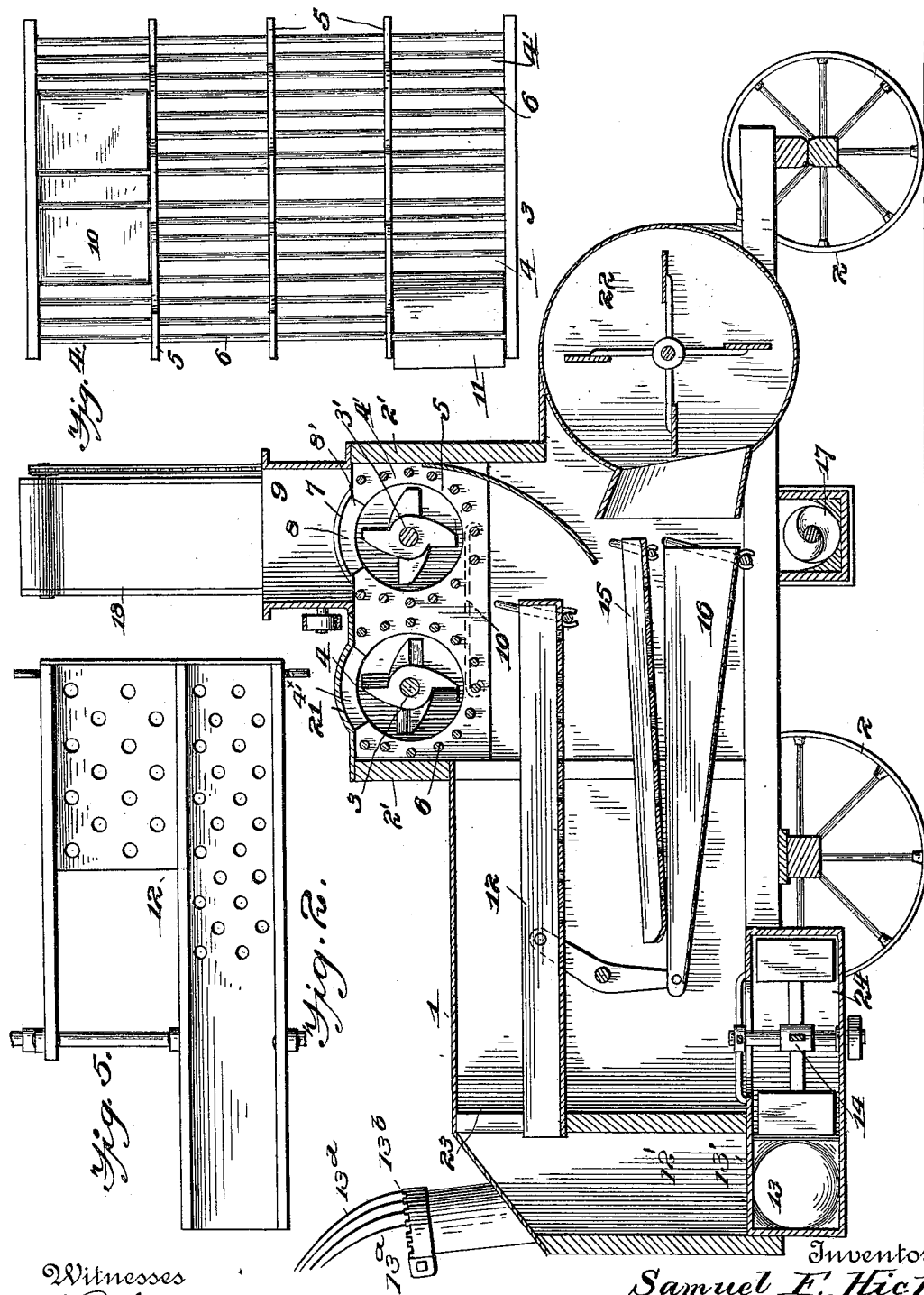
Witnesses
Inventor
Samuel F. Hicks,
By Fred G. Codren
Attorney No. 636,665. Patented Nov. 7, 1899.
S. F. HICKS.
CORN SHELLER.
(Application filed Aug. 23, 1898.)
(No Model.) 4 Sheets—Sheet 3.
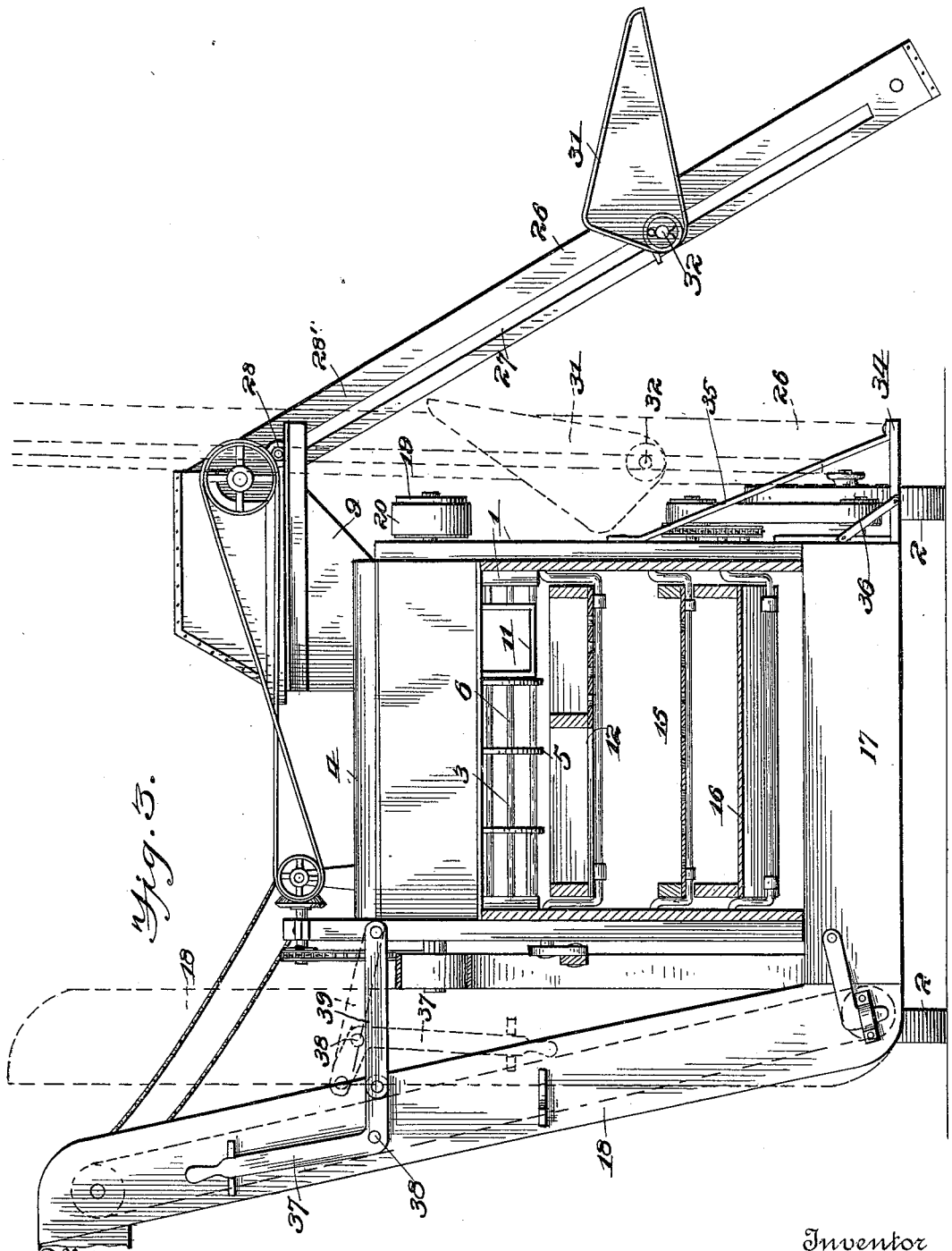

No. 636,665. Patented Nov. 7, 1899.
S. F. HICKS.
CORN SHELLER.
(Application filed Aug. 23, 1898.)
(No Model.) 4 Sheets—Sheet 4.
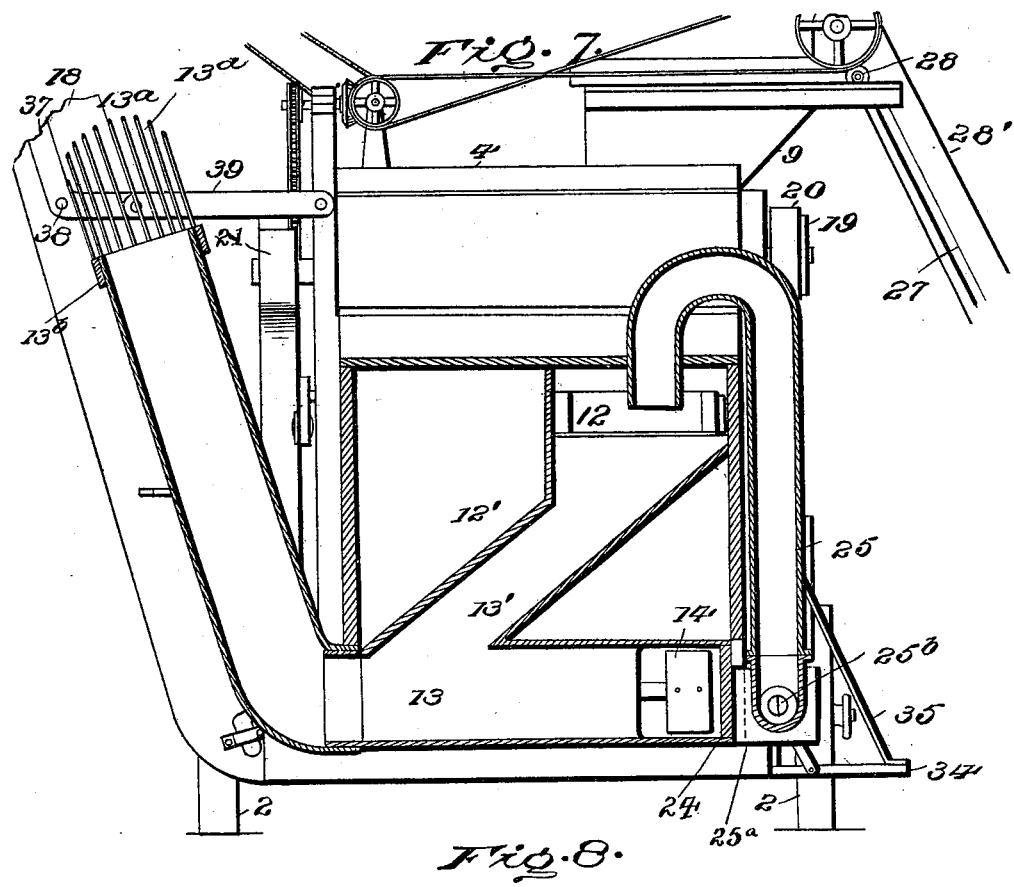
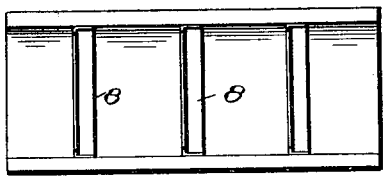
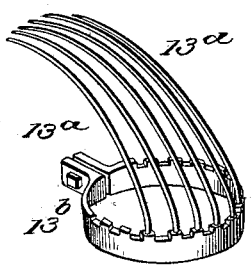
Witnesses
Inventor
Samuel F. Hicks
By Fred G. Coldren
Attorney

UNITED STATES PATENT OFFICE.

SAMUEL F. HICKS, OF CHILLICOTHE, ILLINOIS.

CORN-SHELLER.

SPECIFICATION forming part of Letters Patent No. 636,665, dated November 7, 1899.

Application filed August 23, 1898. Serial No. 689,275. (No model.)

*To all whom it may concern:*

Be it known that I, SAMUEL F. HICKS, of Chillicothe, in the county of Peoria and State of Illinois, have invented certain new and useful Improvements in Corn-Shellers; and I do hereby declare the following to be a full, clear, and exact description of the invention, such as will enable others skilled in the art to which it appertains to make and use the same.

This invention contemplates certain new and useful improvements in corn-shellers.

The primary object of the invention is to provide for the ejection of the cobs by air-currents without allowing them to contact with the fan or blower.

A further object is to provide shelling-cylinders so constructed that the cobs will not be ground, thus lessening the quantity of dust and pieces of cob to be separated from the corn before the same leaves the machine.

A further object is to so construct the feed-elevator and delivery-elevator that they can be readily thrown out of operative position when they are not desired for use or when the machine is moving from place to place.

The invention will be hereinafter fully set forth, and particularly pointed out in the claims.

In the accompanying drawings, Figure 1 represents a side elevation of a corn-sheller embodying my invention. Fig. 2 is a longitudinal section thereof. Fig. 3 is a section taken on the line 3 3, Fig. 1, looking toward the front of the machine. Fig. 4 is a top plan view of the sheller-cylinder casings, showing the relative position of said cylinders and the means whereby the ears of corn are carried from one to the other. Fig. 5 is a reduced top plan view of the upper oscillating sieve. Fig. 6 is a perspective view of the hopper adapted to be secured to the feed-elevator. Fig. 7 is a transverse vertical sectional view adjacent the rear end of the machine. Fig. 8 is a bottom plan view of the cover of one of the shelling-cylinders. Figs. 9 and 10 are details.

Referring to the drawings, 1 indicates the inclosing body or casing, which is suitably mounted on wheels 2. In a raised portion of this body are two shelling-cylinders 3 3', surrounded by casings 4 and 4'. These latter consist of a series of oppositely-disposed metallic rings 5, having perforations therethrough for transversely-extending rods 6. The casing 4' is partially covered by a cover 7, having depending flanges 8 on the under side thereof adapted to prevent the cobs from traveling on a straight line lengthwise longitudinally of the cylinder. The covering of casing 4 has similar flanges $4^\times$.

The numeral 9 indicates the hopper, through which the corn is fed to the cylinder 3' at one end thereof through an opening left at one end of the cover 7. As the ears are thus fed the blades of the cylinder will force them to travel around within the casing to the other end of said cylinder. From this end of the cylinder and its casing the ears are forced over a horizontally-disposed platform 10, connecting said casing with the other casing 4. Thereupon the ears of corn and the cobs will be subjected to the action of the cylinder 3, the blades of which will force the ears and cobs through casing 4 in opposite direction to the passage through casing 4'. As the cobs reach the discharge end of casing 4, by which time the corn will be entirely removed from the cobs, said cobs will fall upon the horizontal platform 11, from which they will fall onto an oscillating shoe or sieve 12, from whence they will be discharged into a box 12', into which said sieve opens. This box has, preferably, an inclined passage-way 13', which discharges at one end into a chute 13. Beneath the passage 13' the chute 13 leads to the casing 24 of a fan or blower 14, which may be rotated by a suitable connection from any moving portion of the machine. Thus the cobs are discharged into the chute without contact with the fan, and they are blown out by the air-current. The chute 13 terminates in the form of a cylinder, on the outer end of which is a hood $13^a$, which consists of an adjustable band $13^b$, having a series of curved rods $13^d$ projecting therefrom. These rods by adjusting the band will effect the discharge of the cobs in the desired direction. To the outer side of the casing of fan 14 is connected the lower end of a pipe 25, which is extended upward and then over box 12', through the top of which the end of said pipe opens. Through this pipe a current of air is provided for aiding in the discharge of the cobs from the projecting end of sieve 12. The lower end of pipe 25 has a sliding-vale 25ᵃ, by which the air-inlet is controlled. A plug 25ᵇ may be removed from the extreme lower end of said pipe to remove any choke therein.

During the process of shelling the corn will fall between the transverse rods 6 of the casing 4' upon an oscillating sieve 15 and through said rods of a portion of the casing 4 upon the cob-sieve 12, and it will be noted that the oscillation of said sieve will cause the corn to pass through the perforations therein and fall upon the sieve 15, the oscillation of the latter in turn causing the grain to fall into the oscillating inclined pan 16, from whence it passes to the grain-box 17, from which it is carried either by a rotary conveyer or by a belt conveyer to the delivery-elevator 18, through which it is carried upwardly by the usual belt conveyer and delivered into any suitable receptacle. The outer ends of the shafts of the shelling-cylinders are provided with wheels 19, connected by a belt 20, which causes said cylinders to revolve in the same direction.

21 indicates a band-wheel by means of which power is transmitted from the main power-shaft to one of the shelling-cylinders.

22 indicates a blower which is adapted to bring a current of air in contact with the grains of corn upon the sieves and pan for the obvious purpose of separating the dust, dirt, and small particles of cob therefrom, the undesirable material being forced through the opening into box 12' and into the casing of fan 14, by which latter it is driven through the chute 13 to the outside air.

26 designates the feed-elevator, adapted to rest upon the ground at its lower end when the machine is in operation. Said elevator is provided with an elongated channel or slot 27, which receives rollers 28, pivoted to horizontal arms of the hopper 9. Said elevator is also provided with two side flanges 28', as is usual, between which is adapted to run a belt conveyer 29, the operation of which is shown in dotted lines, Fig. 1, it being considered unnecessary to show the conveyer in its entirety.

30 indicates a hopper provided with two side flanges 31, perforated at opposite ends for the passage of a short shaft 32, having a head 33 on one end thereof, the other end being screw-threaded for the reception of a nut. This shaft is adapted to extend transversely through the slot or channel 27 in the elevator and adjustably secures the hopper thereto, as it will be noted that by loosening and tightening the nut the hopper can be adjusted at any desired point in the length of the chute. It will further be noted that said hopper when not desired for use can be folded against the elevator, as shown in dotted lines in Fig. 3. The elevator travels on the rollers 28 when being moved into and out of position.

34 indicates a bracket suitably supported on the side of the frame by means of brace-rods 35 and 36, upon which said elevator may rest when not in use, as clearly indicated by dotted lines, Fig. 3.

As a means for rocking the delivery-elevator to inoperative position or to the position shown in dotted lines in Fig. 3 I provide angle-levers 37, pivoted to opposite sides of the elevator at 38, said levers being adapted to be rocked and through the medium of pivoted arms 39 rock the said elevator to inoperative position.

Having described the mechanism wherein my invention lies, I will now proceed to describe the operation of the machine.

The elevator is put into operative position, with the hopper 30 resting upon the corn-crib, when the ears of corn are shoveled or otherwise thrown into the said hopper, from whence they will be carried to the hopper 9 by the endless conveyer 29. The corn will pass from the hopper 9 to the cylinder 3', where by the shelling-blades it will be caused to travel through the casing 4' to the platform 10, across which it will be forced into the casing 4 to be operated upon by the blades of the shelling-cylinder 3. By this time the grain will be entirely removed from the cobs and the latter pass out of the casing upon the platform 11, from whence they are forced by the succeeding cobs upon one side of the oscillating sieve 12, from which latter they are discharged into box 12' and by the currents through the pipe 25 and the lower branch of chute 13 are blown out through the latter by the combined currents of the fans 14 and 22, the dust being also blown out through said chute 13.

In practice the transverse rods are suitably spaced apart from each other and from the cylinders to prevent the cob from being crushed or ground, and by reason of the length of the shelling-cylinder casings all of the grains are removed from the cob by the time the ears reach the point where they are delivered to the oscillating sieve.

I do not desire to be understood as limiting myself to the precise construction shown in the drawings, and many minor changes and modifications involving mechanical skill may be made within the scope of the invention without departing from the spirit thereof, and I do not desire to be understood as limiting myself in any way to the connections whereby power is transmitted to the various movable parts, and it will be understood that the sieves may be oscillated in the usual manner.

I claim as my invention—

1. A corn-sheller having shelling-cylinders adapted to rotate in the same direction, cylinder-casings comprising a series of spaced-apart rings, circularly-arranged rods extending through said rings, a passage-way between said casings at one end, means for removing the cobs from the other end of one of said casings, and means for rotating the shelling-cylinders, substantially as described.

2. The combination with a corn-sheller, of a feed-elevator having a vertically-movable and folding hopper thereon, and means for maintaining the hopper at any desired point upon said elevator, substantially as described.

3. The combination with a corn-sheller, of a feed-elevator having a longitudinal channel or slot therein, rollers mounted upon a fixed portion of the machine and extending into said channel or slot, said elevator being adapted to move upon said rollers, a hopper vertically movable in the channel or slot in said elevator and adapted to be folded thereon, and means for securing the hopper at any desired point upon the elevator, substantially as described.

4. The combination with the corn-sheller, of a feed-elevator having an elongated slot or channel therein, rollers mounted upon fixed portions of the machine and extending into said slot or channel, said elevator being movable upon said rollers, a hopper movable in said slot and adapted to be folded upon the elevator, means for adjustably securing the hopper at any desired point upon the elevator, and a bracket secured to the lower portion of the frame and adapted to support the elevator when the same is in inoperative position, substantially as described.

5. A corn-sheller having shelling mechanism, a box having an inclined passage-way, a cob-sieve extending into said box, above said passage-way, a chute into which said passage-way opens, a blower at one side of the sheller opening into one end of the chute for injecting air into the latter, a pipe leading from the blower and opening into the upper portion of the box, a removable plug located in said pipe, and means for controlling the passage of air into said pipe, substantially as set forth.

6. A corn-sheller having shelling mechanism, a box, a cob-sieve extending into said box, a blower, a chute leading from said blower into which said box opens, a pipe leading from the casing of said blower and opening into said box, and a sliding valve between said casing and said pipe, substantially as set forth.

In testimony whereof I have signed this specification in the presence of two subscribing witnesses.

SAMUEL F. HICKS.

Witnesses:
F. L. WILMOT,
G. W. SMITH.